United States Patent [19]

Truckenbrodt

[11] Patent Number: 4,639,031
[45] Date of Patent: Jan. 27, 1987

[54] REPOSITIONABLE THERMAL INSULATING TRUCK BULKHEAD

[75] Inventor: Randall Truckenbrodt, Western Springs, Ill.

[73] Assignee: Randall Industries, Hinsdale, Ill.

[21] Appl. No.: 724,317

[22] Filed: Apr. 17, 1985

[51] Int. Cl.⁴ ............................................. B62D 33/04
[52] U.S. Cl. .................. 296/24 R; 296/24 B; 160/84 R; 410/130
[58] Field of Search ............................ 296/24 R, 24 B; 160/84 R; 410/130, 128, 129, 127

[56] References Cited

U.S. PATENT DOCUMENTS

2,725,827 12/1955 Wehby ............................. 296/24 R
3,057,284 10/1962 Learmont ....................... 296/24 R
3,376,599 4/1968 Singer ............................. 296/24 R
4,049,311 9/1977 Dietrich ......................... 296/24 R Primary Examiner—Robert R. Song
Attorney, Agent, or Firm—Jerry A. Schulman

[57] ABSTRACT

A repositionable thermal barrier for truck trailers has a hanger bar extending across the width of the trailer with a flexible strip-type or blanket-type thermal insulator supported by the hanger bar. A trolley-and-hinge assembly attached to one end of the hanger bar is repositionable along a trolley rail attached to one interior wall of the trailer, and a releasable latch assembly, attached to the remaining end of the hanger bar, is selectively latchable to a latch rail attached to the opposite interior wall of the trailer. A trolley lock engages and disengages responsive to the pivotal movement of the hanger bar to allow the tolley to move along the trolley rail.

20 Claims, 13 Drawing Figures

REPOSITIONABLE THERMAL INSULATING TRUCK BULKHEAD

The present invention relates to thermal barriers and, more particularly, to barriers suitable for installation in and positioning along the length of a refrigerated truck trailer.

Transporting and delivering refrigerated goods requires the use of truck trailers equiped with either refrigeration units, or with other means of cooling the air within the trailer sufficiently to protect the cargo. One of the most obvious examples of such cargo is refrigerated or frozen food which, if allowed to warm, may become unsaleable due to the presence of mold, bacteria, or the type of freezer damage incurred when frozen foods are thawed and refrozen. Other examples of such goods would be, for example, medical supplies such as whole blood and the like.

Where a trailer is fully loaded at a single loading site, then transported to an unloading site where it is fully unloaded, problems with respect to maintaining a sufficiently cool temperature are minimized. This is because the trailer doors, once closed, remain closed until the goods are unloaded, and thus the trailer's refrigeration system need not deal with the loss of cooled air which occurs when the trailer doors are opened, no matter how briefly.

Often, however, a single refrigerated trailer may contain goods which are loaded at separate sites and which are intended to be unloaded at separate sites. Where, for example, a single truck is used to deliver refrigerated cargo to a number of purchasers, the typical practice is to load the trailer such that the last load to be delivered is onloaded first at the front of the trailer, with the succeeding loads stacked thereafter in the reverse order in which they are to be delivered.

As delivery proceeds, the truck trailer becomes partially emptied. This means that the refrigeration unit is now cooling not only the remaining cargo, but the empty portion of the trailer as well. Each time the trailer doors are opened, and cargo is removed, air cooled by the refrigeration system is lost and the warmer air which replaces it must then be cooled in order to protect the remaining cargo.

One serious disadvantage to such an arrangement is that the cargo which is loaded first is also the cargo which is unloaded last and is thus subjected to the full effect of the warming and cooling due to the opening and closing of the trailer doors each time a load is delivered.

One approach to efficiently maintaining the cooling capacity of the trailer has been to provide a movable bulkhead which can be repositioned along the length of the trailer. In this manner, the bulkhead may be used to close off that portion of the trailer which still retains goods required to be refrigerated. Past attempts to utilize such a system have, however, proven to be less than successful.

There are known, for example, rigid bulkheads of a construction similar to that of the side walls of the truck itself. Such bulkheads are typically expensive, complex, difficult to position, heavy, and must be moved each time the goods contained behind the bulkhead are to be loaded or unloaded. While some such bulkheads have doors which may be opened, a great majority of such bulkheads are solid and it is impossible to see precisely what is behind the bulkhead without first moving it.

Known bulkheads in the art feature heavy mounting hardware, and, in order to be moved, are hinged such that the entire bulkhead is lifted, much in the manner of an overhead garage door, and then positioned along the roof of the trailer when not in use. Such doors are difficult to repair and represent a potential safety hazard should the door hardware fail and the door come crashing down.

Another approach to providing such temperature control is a "curtain", fashioned either from overlapping vinyl strips, or from an insulating "blanket" consisting of fabric sandwiched around an insulating core. The strips or blanket are secured along a horizontally extending overhead member. The vinyl strips are light in weight, and are made from translucent or transparent vinyl material, allowing the cargo behind the strips to be seen, while avoiding the storage and manipulation problems inherent in the use of heavy, rigid bulkheads.

Such strip-type curtains have been modified for use in truck trailers by providing a horizontally extending aluminum support member from which the individual strips are suspended, and a track-and-trolley extending along the upper wall of the trailer proximate the roof, whereby the horizontally extending support member can be positioned at various sites along the length of the trailer. Yet another system used in the past involves the permanent installation of the horizontal support member to the trailer wall at a hinge which allows the strip-type curtain to be stored along the sidewall of the trailer, but does not allow the curtain to be repositioned along the length of the trailer.

It has been observed that where individual insulating bulkheads are either awkward or inconvenient to use, the tendency for operators of refrigerated vehicles is to not use them, thereby subjecting cargo to the vagaries in temperature incurred when the trailer doors are opened and closed frequently. In particular, with respect to strip-type curtains, it is possible for a person to walk through the curtain without having to move it to one side. This facilitates the on-loading and off-loading of individual packages or small numbers of packages. Where, however, goods must be loaded in bulk, such as by forklift truck, it becomes extremely desireable to provide a way for the curtain to be moved from its position stretching across the load space to enable free access to the cargo or the cargo space. Without a facile, easily operated structure to enable the movement of such a curtain along the trailer length and across the trailer width it is believed that these will be a tendency for the operator to fail to use it properly.

Accordingly, the need exists for a lightweight, flexible thermally insulating bulkhead which may be positioned at selected sites along the length of a refrigerated trailer, thereby varying the air space required to be cooled, while, at the same time, providing structure which enables the bulkhead to be moved to a loading or storage position along side one of the trailer's side walls.

BRIEF DESCRIPTION OF THE INVENTION

A strip-type curtain used to close off selected load volumes of a refrigerated truck trailer comprises a horizontally extending overhead support bar from which individual nylon-reinforced vinyl strips are suspended, with the support bar positioned proximate the roof of the refrigerated truck trailer, and the individual strips extending downward therefrom to the floor of the trailer. The support bar is attached, at one end thereof, to a trolley via a universal joint construction and, at the other end thereof, to a lock mechanism and depending lock control staff. Attached to and extending longtitudinally along the side walls of the truck trailer, proximate the ceiling thereof, are first and second track members, with the first track member sized, shaped, and dimensioned to rollingly accommodate the trolley, and the second track member sized and shaped to engage the lock mechanism at selected sites therealong. A trolley lock mechanism enables the trolley to be retained at selected sites along the first track member. Means may also be provided along the first track member to enable the lock mechanism to be secured thereto when it is desired to position the strip-type curtain parallel to the side wall of the truck for storage, or to enable the loading or unloading of bulk amounts of cargo. Another preferred version of the invention utilizes a laminated fabric insulating blanket suspended from the overhead support bar.

BRIEF DESCRIPTION OF THE DRAWINGS

These, and other objects and advantages of the present invention will be best understood by considering the accompanying drawings wherein.

DETAILED DESCRIPTION OF THE DRAWINGS

Figures 1, 3:
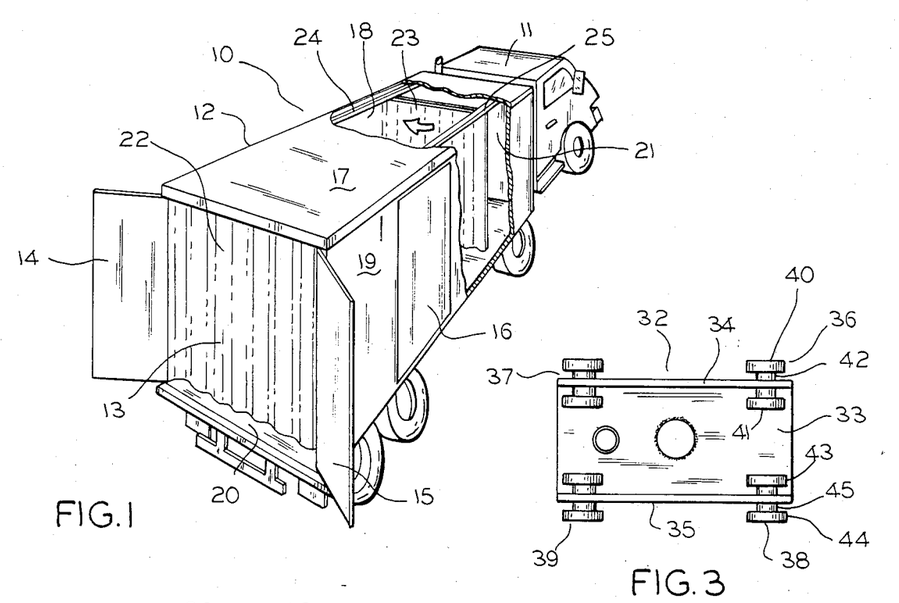
FIG. 1 is a perspective view of a trailer truck demonstrating placement and use of the present invention in the trailer.
FIG. 3 is a bottom view of the trolley used in the present invention.

Referring now to FIG. 1, the numeral 10 indicates generally a trailer-and-truck combination, having a truck cab 11 to which a truck trailer 12 is hitched. For the purposes of describing the present invention, it will be assumed that the truck trailer 12 is of the type having a refrigeration unit (not herein specifically shown) utilized to keep the interior of trailer 12 at a uniform, desired, cool temperature. Trailer 12 has a rear cargo opening 13 closed off by rear doors 14 and 15, and a side loading door 16 shown herein in a closed position. It is to be understood that such truck trailers are manufactured in many different variations and styles, with differing numbers and locations of loading doors, and the descriptions and characterizations of the doors shown specifically herein in FIG. 1 are to be taken as exemplary rather than limiting.

Trailer 12 has a roof 17, a left side wall 18, a right side wall 19, and a floor 20. A rigid front bulkhead 21 closes off the front end of the trailer. As shown in FIG. 1, a pair of strip-type curtains 22 and 23, embodying the present invention are therein installed.

Figure 2:
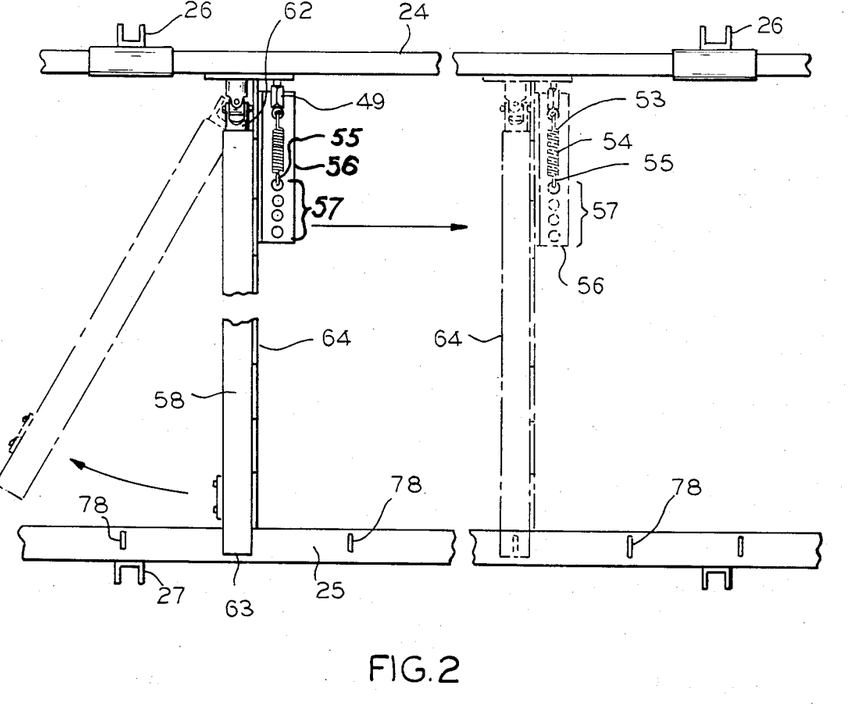
FIG. 2 is a top plan view of the present invention, as installed in the trailer of FIG. 1, demonstrating movement of the present invention between selected sites, and demonstrating alternative trolley lock constructions.

Referring now to FIG. 2, a pair of mounting rails are arranged in fixed parallel spatial relationship, with trolley rail 24 and locking rail 25 each positioned along a side wall of truck trailer 12. As shown in FIG. 1, in the embodiment herein presented, trolley rail 24 is mounted proximate roof 17 and is attached to side wall supports 26 forming a portion of side wall 18. In like fashion, locking rail 25 is shown installed at substantially the same position along side wall 19, attached to side wall supports 27.

Figure 5:
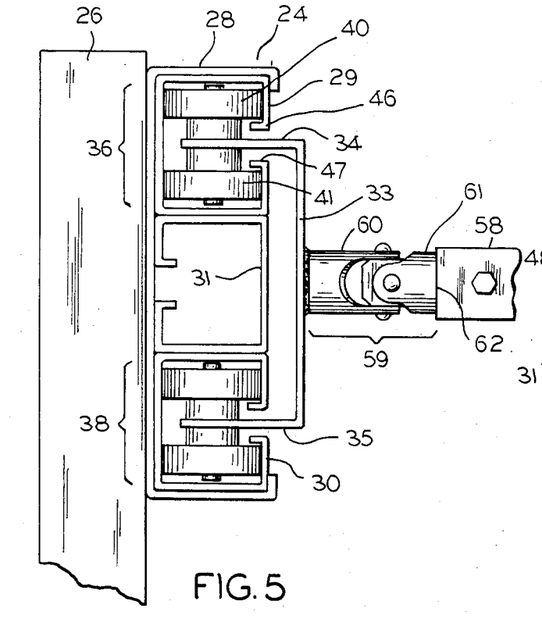
FIG. 5 is a partial front view of the embodiment of FIG. 4 illustrating placement of the trolley within the trolley track.

Referring now to FIG. 5, trolley rail 24 is shown in detail and, in a first embodiment herein described, is formed from a first elongated C-shaped outer rail web 28 within which are positioned upper track web 29 and lower track web 30. Extending between upper track web 29 and lower track web 30 is substantially C-shaped spacer web 31.

When fully assembled, trolley rail 24 includes outer rail web 28, upper track web 29, lower track web 30, and spacer web 31 welded or otherwise fastened together to form a rail construction of substantially uniform cross-sectional configuration and dimensions, with the three smaller sections, as assembled within the larger section, stiffening and strengthening the entire rail. A preferred embodiment of the present invention contemplates that trolley rail 24, in the configuration substantially herein shown, will be furnished in uniform lengths which may be combined and/or cut to fit along the inside length of a truck trailer such as trailer 12.

Referring now to FIG. 3, a trolley 32 is shown having a flat base plate 33 from which wheel flanges 34 and 35 depend. Wheel assemblies 36 and 37 are mounted in tandem to flange 34, while wheel assemblies 38 and 39 are similarly mounted in tandem fashion to flange 35, with wheel assemblies 37 and 39 positioned substantially co-axially, as are wheel assemblies 36 and 38.

Referring now to wheel assembly 36 as exemplary of the remaining wheel assemblies, said assembly has an upper wheel 40 and a lower wheel 41 rotatably mounted to an axle 42. In like fashion, wheel assembly 38 has an upper wheel 43 and a lower wheel 44 rotatably mounted to an axle 45.

Referring again to FIG. 5, it can now be seen that, by way of illustration, wheel assembly 36 is closely accommodated by upper track web 29, while wheel assembly 38 is closely accommodated by lower track web 30. As herein shown, upper track web 29 accommodates upper wheel 40 within the uppermost portion of the C-shaped web, while lower wheel 41 is received by the lowermost portion of the C-shaped web. An upper retaining shoulder 46 and a lower retaining shoulder 47 are formed on upper track web 29 to provide more positive direction of wheel assembly 36 and more positive retention of individual wheels 40 and 41 within upper track web 29.

The foregoing description of upper track web 29 and wheel assembly 36 may be equally applied to lower track web 30 and wheel assembly 38, and are exemplary for describing the configuration of the remaining wheel assemblies on trolley 32 and their interengagement with trolley rail 24. Thus shown, when trolley 32 is rollingly inserted into trolley rail 24, it may freely move the entire length of trolley rail 24 and thus, the entire length of trailer 12 within which trolley rail 24 is installed.

Figure 6:
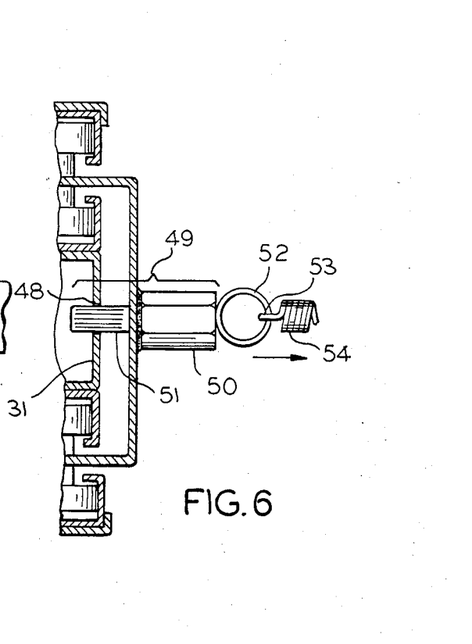
FIG. 6 is a partial sectional view of the trolley assembly of FIG. 5 illustrating a first embodiment of the latching mechanism.

Referring now to FIGS. 2 and 6, two embodiments of a positive locking and locating mechanism are provided for trolley 32 to enable it to be retained at selected positions along trolley rail 24. As shown in FIG. 6, a locking aperture 48 is shown formed in spacer web 31. Preferably, a number of locking apertures 48 are formed at regularly spaced intervals along trolley rail 24 as trolley rail 24 is fabricated. Where desired, an additional aperture may also be drilled or otherwise formed through spacer web 31 at any selected location along trolley rail 24 where no such aperture is already formed.

As seen in FIG. 6, therefrom a trolley lock body 49 has a plunger 50 protruding. Although not herein specifically shown, trolley lock 49 has disposed therewithin a biasing spring which, in its unstressed position, urges plunger 50 outward from trolley lock 49 to its maximum distance, thus enabling plunger 50 to engage locking aperture 48.

In a first embodiment of the trolley lock mechanism, trolley lock 49 is mounted to web 51 (seen in section in FIG. 6). As best seen in FIG. 2, web 51 is mounted to a transverse mounting bar 58, whose function will be more fully described hereinbelow.

In a second embodiment, a plunger ring 52 is attached to the outermost end of plunger 50 to which a first end 53 of a disengaging spring 54 is attached. As best seen in FIG. 2, a second end 55 of disengaging spring 54 is attached to mounting angle bracket 56 which, in a preferred embodiment hereof, is provided with a plurality of mounting sites 57 to which a second end 55 may selectively be secured. The construction and arrangement of mounting angle bracket 56 will be more fully described hereinbelow.

Figure 4:
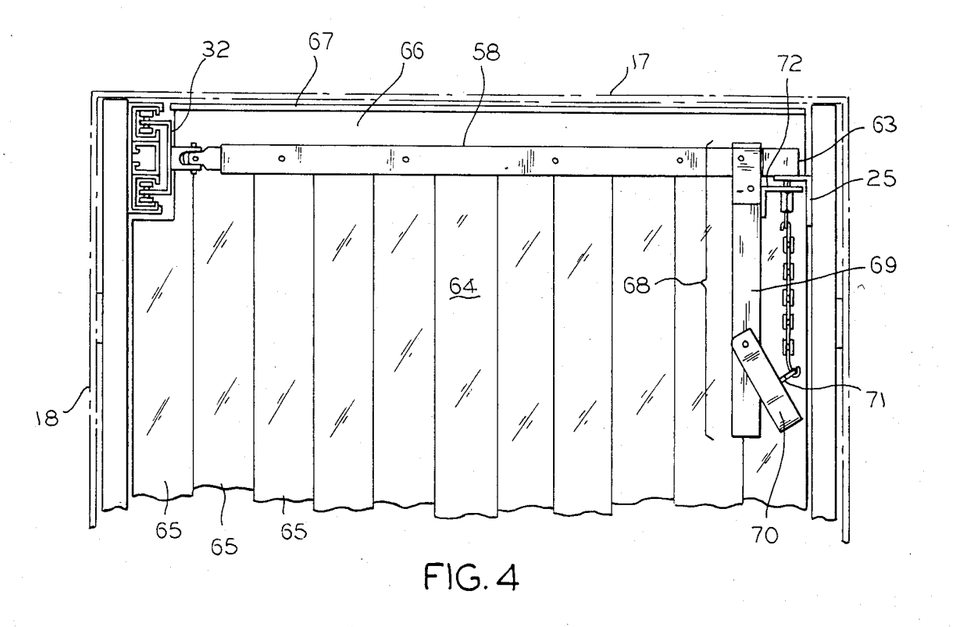
FIG. 4 is a partial front view of the present invention as installed in the truck trailer of FIG. 1, shown in the closed, or latched position.

As best seen in FIG. 4, tranverse mounting bar 58 extends the width of trailer 12 and between trolley assembly 32 and locking rail 25. As best seen in FIG. 5, mounting bar 58 is attached to trolley plate 33 by a universal joint assembly 59 having a first joint member 60 welded or otherwise permanently attached to trolley plate 33, and a second joint member 61 bolted or otherwise attached to joint end 62 of mounting bar 58. Universal joint assembly 59 is constructed to allow movement of second joint member 61 horizontally and vertically with respect to first joint member 60, thus allowing mounting bar 58 a range of motion which includes being lowered to the floor 20 of trailer 12 as well as being moved to a position parallel to side wall 18.

As seen in FIG. 4, a preferred embodiment of the present invention includes an insulating strip-type curtain 64 attached to and supported by mounting bar 58. Curtain 64 is fashioned from individual nylon-reinforced vinyl strips, typified by strip 65, attached to mounting bar 58 with each individual strip slightly overlapping the strip positioned adjacent to it. Such strip-type curtains are well known in the art as effective thermal barriers, desirably used to prevent air of a first temperature, positioned on one side of the curtain, from mixing with air of a second, different temperature on the other side of the curtain. In the embodiment herein described, curtain 64 is intended to be placed within trailer 12 in order to prevent the air cooled by trailer 12's refrigeration unit from escaping to or being mixed with ambient air.

As seen in FIG. 4, an individual strip 66 is secured horizontally to mounting bar 58 to extend upward from mounting bar 58 to a point proximate roof 17 of trailer 12. Strip portions 66 may be stiffened, or otherwise reinforced to remain erect, and a gasket member 67 is preferably positioned at the edge of strip 66 to wipe against the underside of roof 17 to act as a further air seal.

Referring again to FIG. 4, the numeral 68 indicates a bar locking assembly positioned proximate lock end 63 of mounting bar 58. A preferred embodiment of bar locking assembly 68 includes a depending lock staff 69 attached at a first end thereof to mounting bar 58. A release handle 70 is pivotally secured to lock staff 69, and has an anchoring stirrup 71 attached thereto as shown in FIG. 4.

Lock staff 69 further has lock mount 72 attached thereto proximate mounting bar 58, and positioned such that, when lock end 63 of mounting bar 58 is resting upon locking rail 25, lock mount 72 is proximate to and beneath locking rail 25.

Figure 9:
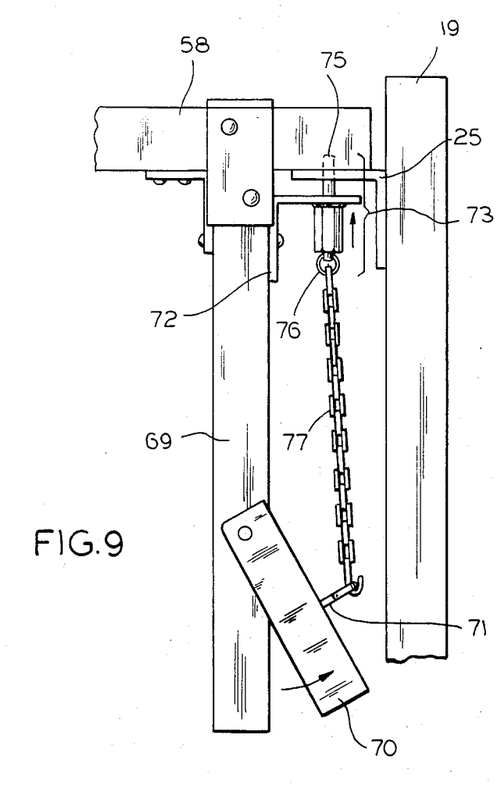
FIG. 9 is a partial front elevation of the lock mechanism of FIG. 8, shown in the latched position.

As best seen in FIG. 9, bar lock 73 is attached, as by welding to lock mount 72. Bar lock 73, preferably, is similar in construction to trolley lock 49, having a body 74 from which a plunger 75 is spring biased to protrude, when unstressed. A lock bar mounting ring 76 is attached to the lowermost end of plunger 75, and a release chain 77 is secured to bar lock ring 76 at one end thereof, with the other end thereof secured to anchor 71.

Figure 8:
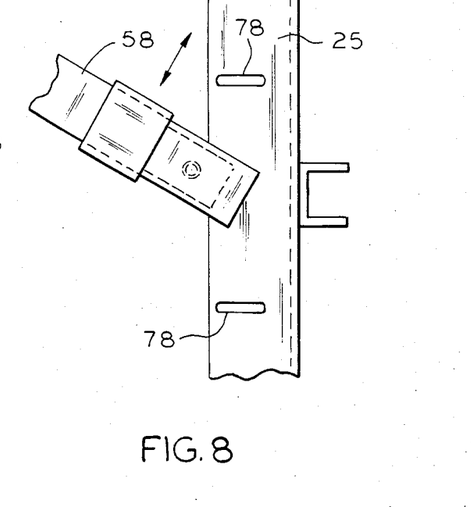
FIG. 8 is a partial top view of the lock mechanism shown in FIG. 1.

As best seen in FIG. 8 and in FIG. 2, locking rail 25 is preferably formed as an L-shaped web, with lock apertures 78 positioned at selected intervals therealong. As shown herein, lock apertures 78 are elongated ovals, to allow plunger 75 of bar lock 73 to engage locking rail 25 while allowing some tolerance for variations in the widths of selected trailers with respect to the length of mounting bar 58. As with the apertures previously described in trolley rail 24, additional apertures may be formed, where desired, along locking rail 25.

Figure 11:
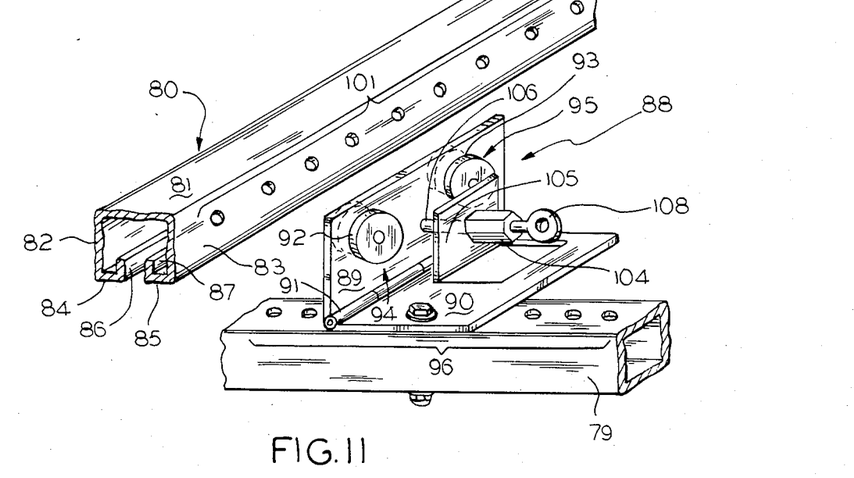
FIG. 11 is a partial perspective view of another preferred embodiment of the trolley and hinge assembly.
Figure 12:
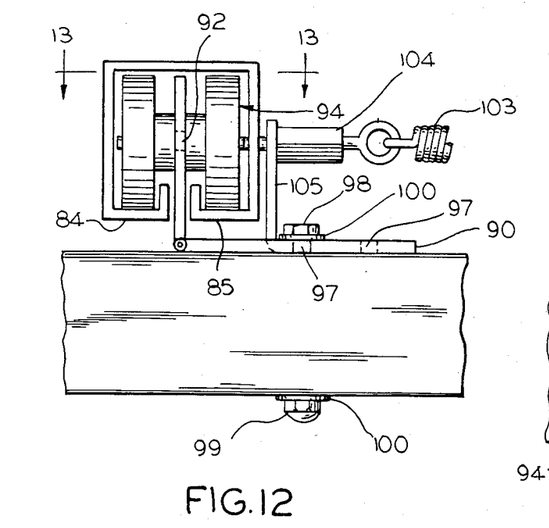
FIG. 12 is a partial front view of the embodiment of FIG. 11, illustrating placement of the trolley in the track.
Figure 13:
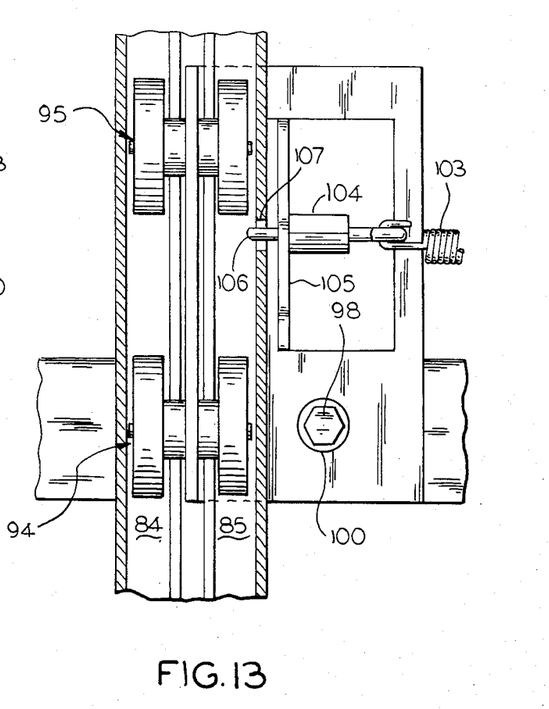
FIG. 13 is a partial top sectional view along 13—13 of FIG. 12.

In FIGS. 11–13 there is shown another preferred embodiment of the track-and-trolley arrangement utilized to reposition hanger bar 79.

Referring now to FIG. 11, trolley rail 80 is formed as a single, longitudinally-extending web having a generally C-shaped cross-sectional configuration, with the open portion of the C facing downward, thus providing trolley rail 80 with a flat upper wall 81 from which sidewalls 82 and 83 depend. Sidewall 82 is bent to form a trolley run 84, while sidewall 83 is bent to form a similar trolley run 85. Each trolley run 84 and 85 has a retaining lip, 86 and 87, respectively, formed at its outermost portion.

FIG. 11 also illustrates another preferred trolley assembly 88 which includes a first leaf 89 joined to a second leaf 90 at hinge joint 91. A standard, heavy-duty hinge, such as the well-known door hinge, has been used successfully to form this assembly.

As seen in FIGS. 11 and 12, leaf 89 has a pair of wheel axle apertures 92 and 93 formed therethrough, which used to mount front wheel assembly 94 and rear wheel assembly 95, in tandem, to leaf 89. Wheel assemblies 92 and 93 are sized and configured to allow free movement of trolley assembly 88 along trolley runs 84 and 85, as seen in FIGS. 12 and 13. FIG. 12 further shows that wheel assembly 95 is contrained horizontally within trolley rail 80 by sidewalls 82 and 83, and retaining lips 86 and 87, and is constrained vertically by top wall 81 and trolley runs 84 and 85.

As seen in FIG. 11, hanger bar 79 has at least one file of apertures 96 formed partially therealong. One or more bar mounting apertures 97, as seen in FIG. 12, are formed on leaf 90. Said mounting apertures correspond in size and spacing to those of aperture file 96 to enable adjustable attachment of leaf 90 to hanger bar 79 to take into account variations in trailer width.

Referring now to FIGS. 12 and 13, hanger bar 79 is seen as attached to leaf 90 by pivot bolt 98 and cap nut 99. Bearing washers 100 may be interposed between the head of bolt 98 and hanger bar 79, and between cap nut 99 and hanger bar 79 to facilitate pivotal movement of hanger 79 with respect to trolley assembly 88.

Trolley rail 80 has a series of spaced locking apertures 101 formed along sidewall 83, as shown in FIG. 11. Trolley locking assembly 102 includes a trolley lock 104, attached to a mounting plate 105 preferably stamped from leaf 90, as seen in FIGS. 11 and 12. Lock plunger 106 extends through an aligned passage 107 through leaf 89, and is sized and positioned to engage selected of said apertures 101 to position hanger bar 79 along trolley rail 80. In a first embodiment, as shown in FIG. 11, trolley lock 104 is mounted on plate 105 and is disengaged by lowering hanger bar 79 via hinge joint 91. If, when hanger bar 79 is raised, plunger 106 does not register with one of said series of locking apertures 101, plunger 106 will be forced into trolley lock 104 unticut forced into trolley lock 104 until hanger bar 79 is adjusted slightly along rail 80 to align plunger 106 with the nearest locking aperture.

In a second embodiment, end 108 is selectively attachable to hanger bar 79 substantially as discussed hereinabove, to facilitate disengagement of lock plunger 106 from trolley rail 80 when hanger bar 79 is pivoted, thus allowing repositioning of trolley assembly 88 along trolley rail 80.

Figure 10:
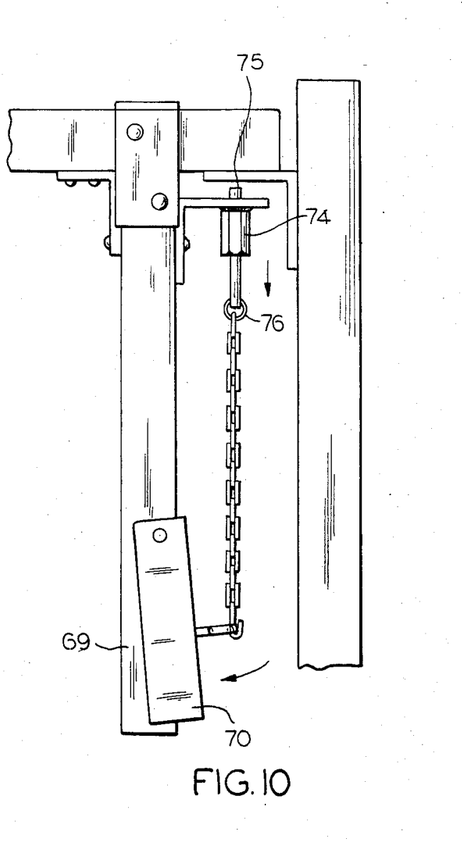
FIG. 10 is a view of the mechanism shown in FIG. 9 in the unlatched position.

Operation of the present invention may now be conveniently described. As seen in FIG. 2, strip-type curtain 64 is shown positioned at an initial location within trailer 12, with mounting bar 58 secured to locking rail 25 at lock end 63 by bar locking assembly 68, and with joint end 62 of mounting bar 58 secured in position to trolley rail 24 by a trolley lock such as that shown at 49. When it is desired to move locking bar 58 along the length of trailer 12, such as to the position shown in phantom in FIG. 2, the following procedure is followed. Lock staff 69 is held in one hand, while release handle 70 is grasped with the remaining hand and pivoted toward lock staff 69, as seen in FIG. 10. When release handle 70 has reached the position shown in FIG. 10, plunger 75 has cleared the locking aperture 78 within which it was initially positioned. Thereafter, while holding release handle 70 in the position shown in FIG. 10, lock staff 69 may be lifted slightly and, thereby, mounting bar 58 may be pivoted at universal joint assembly 59, with respect to trolley 32.

Figure 7:
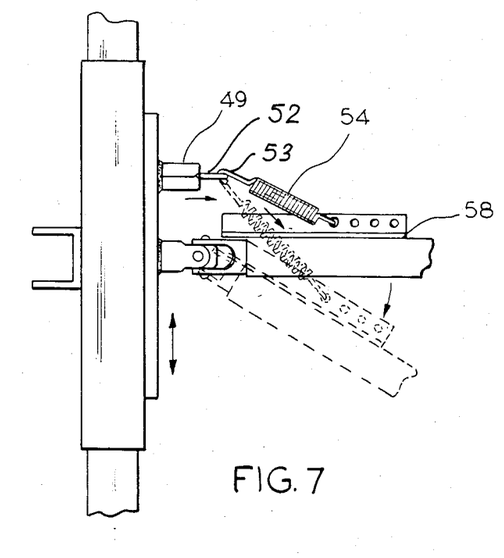
FIG. 7 is a partial top view of the invention as installed in the truck trailer of FIG. 1 illustrating the operation of a second embodiment of the lock mechanism as shown in FIG. 6.

As best seen in FIG. 7, as mounting bar 58 is pivoted in a direction away from trolley lock 49, spring 54 is stressed, thus moving plunger 51 a sufficient distance to disengage it from aperture 48 within which it was initially disposed. Once plunger 51 has cleared aperture 48, trolley 32 may be freely moved along the length of trolley rail 24 to a new, desired position. Once the new position has been reached, mounting bar 58 is moved toward trolley lock 49, thus releasing the tension exerted by spring 54 and allowing plunger 50 to engage locking rail 24. When trolley 32 is further moved along locking rail 24 until it is aligned with a selected mounting aperture 48, plunger 51 is urged to engage aperture 48, thus securing trolley 32 in position.

As best seen in FIG. 8, locking bar 58 may then be pivoted toward locking rail 25 and, when it is resting on locking rail 25, release handle 70 may be released, allowing plunger 75 to extend outward from plunger housing 74 to engage a selected locking aperture 78. Once thus released, locking bar 58 has been positively and easily relocated to a selected position along the length of trailer 12.

Following the aforesaid procedure with respect to the trolley lock embodiment shown in FIG. 6, when mounting bar 58 is moved away from trolley lock 49, plunger 50 disengages from aperture 48, allowing movement of trolley 32. When mounting bar 58 is moved back toward trolley lock 49, plunger 50 will engage track side wall 83, and may be adjusted to engage one of said apertures 101, thereby locking bar 58 into position, as seen in FIG. 2.

Where it is desired to position locking rail 58 parallel to and proximate to side wall 18 of trailer 12, a second locking rail 25 may be secured to said side wall in position beneath trolley rail 24, or, individual brackets may be positioned at selected sites along side wall 18 and beneath trolley rail 24 to engage bar lock 73 and thereby secure mounting bar 58 to side wall 18.

Universal joint assembly 59 is designed such that mounting bar 58 will drop to the floor of trailer 12 once staff 69 is released. This arrangement prevents undue strain on the joint assembly itself and upon trolley 32 thereby prolonging the useful life of trolley 32 and reducing the possibility of having the trolley wheels jammed within the tracks.

One of the advantages of strip-curtain type thermal barriers is that they are extremely lightweight, particularly as compared to rigid bulkheads. It is thus contemplated that the operation of release handle 70 and staff 69 may be accomplished with one hand, and that the repositioning of mounting bar 58, and consequently strip-type curtain 64 may be accomplished with one hand.

Referring now to FIG. 2, it can now be understood that the apertures 57 formed in mounting angle 56 enable repositioning of the spring end 55 to alter the tension exerted on trolley lock 49 as mounting bar 58 is pivoted away from trolley lock 49. In this fashion, it becomes possible to adjust the degree to which mounting bar 58 must be moved in order to effect disengagement of trolley lock 49 from trolley rail 24. Repositioning spring end 55 is also advantageous when the width of support bar 58 varies from the width of trailer 12.

Strip-type curtain 64, being formed from individually depending strips 65, allows a person to pass through the curtain simply by moving the strips to one side. This allows a person to off-load individual items carried on trailer 12 without having to reposition strip-type curtain 64. As shown in FIG. 1, it is contemplated that a plurality of strip-type curtains may be positioned within trailer 12, as desired, to create more than one temperature-controlled zone within which to carry selected cargo. As herein described, it is contemplated that more than one strip-type curtain assembly 64, as mounted to mounting bar 58 may be accommodated by a single pair of rails such as trolley rail 24 and locking rail 25.

When it becomes desireable to have a one-piece insulating bulkhead, an insulating blanket of the type described earlier herein may be substituted for the strip-type curtain. The blanket, of a known sandwich-type construction, may be suspended from support bar 58 in much the same fashion as heretofore described.

Although not herein specifically shown, the end of trolley rail 24 may be selectively closed off to prevent the accidental disengagement of trolley 32 from trolley rail 24, as where the strip-type curtain 64 is positioned at the loading end of the trailer.

While the foregoing has presented certain specific embodiments of the invention, it is to be understood that these embodiments are provided by way of example only. It is expected that others will perceive variations which, while differing from the foregoing, do not depart from the spirit and scope of the invention as herein described and claimed. As a specific example thereof, it is contemplated that the present invention may be installed and efficaciously used within walk-in type refrigerators, freezers, coolers, and other restricted spaces within which a repositionable, lighweight thermal barrier is desireable.

What is claimed is:

1. Repositionable thermal barrier apparatus extendable between first and second sidewalls, said apparatus comprising:
    a thermal barrier; and
    means extendable between said first and second sidewalls for positioning said thermal barrier therebetween, said positioning means including a horizontal hanger bar from which said thermal barrier depends,
    said hanger bar having first and second ends,
    first and second means for supporting, respectively, said first and second ends of said hanger bar at said sidewalls,
    said first support means including means for adjusting the position of said first hanger bar end along said first sidewall,
    said adjusting means further including means to releaseably retain said adjusting means at selectable sites along said first support means,
    said second support means further including means to releaseably attach said second hanger bar end at selected sites along said second sidewall,
    said attaching means being selectively detachable from said second support means to enable said second bar end to be selectively secured to said first support means at said first sidewall.

2. The apparatus as recited in claim 1 wherein said thermal barrier is formed from overlapping strips of thermoplastic sheeting.

3. The apparatus as recited in claim 1 wherein said thermal barrier is an insulating fabric laminate.

4. The apparatus as recited in claim 1 wherein said first support means includes a trolley rail extending along said first sidewall.

5. The apparatus as recited in claim 1 wherein said second support means includes a latching rail extending along said second sidewall.

6. The apparatus as recited in claim 4 wherein said adjusting means includes
    a trolley assembly having at least one wheel assembly attached thereto; and
    means formed on said trolley rail to guide said trolley wheel assembly therealong.

7. The apparatus as recited in claim 6 wherein said first support means includes means to pivotally mount said first hanger bar end to said trolley assembly.

8. The apparatus as recited in claim 7 wherein said retaining means includes
    a trolley lock having a locking element extendable therefrom; and
    means formed on said trolley rail to lockingly engage said locking element when said locking element is extended therefrom.

9. The apparatus as recited in claim 8 wherein said retaining means further includes means to engage and to disengage said locking element from said trolley rail responsive to the pivoting of said hanger bar at said pivotal mounting means.

10. The apparatus as recited in claim 9 wherein said engagement/disengagement means includes
    a biasing element urging said locking element to extend from said trolley lock; and
    an activating element cooperating with said biasing element and said hanger bar to oppose and overcome said biasing element when said hanger bar is pivoted in a first direction to disengage said locking element, and to release said biasing element to engage said locking element when said hanger bar is pivoted in a second direction.

11. The apparatus as recited in claim 1 wherein said attaching means includes means positioned proximate said second hanger bar end to latch and unlatch said second retaining means to and from said latching rail.

12. The apparatus as recited in claim 11 wherein said latching/unlatching means includes
    a hanger bar latch having a latching element extendable therefrom; and
    means formed at selected sites along said latching rail to receive said latching element.

13. The apparatus as recited in claim 12 wherein said hanger bar latch further includes
    a latch staff attached to and depending from said hanger bar proximate said second end thereof;
    a release handle attached to said latch staff; and
    means extending from said release handle to said hanger bar latch to selectively extend said latching element from said hanger bar latch and draw said latching element into said hanger bar latch.

14. The apparatus as recited in claim 13 wherein said latching/unlatching means includes a biasing element urging said latching element to extend from said hanger bar latch, said latch release handle being operable in a first direction to oppose and overcome said biasing element, and operable in a second direction to release said biasing element, allowing said latch element to extend from said hanger bar latch.

15. The apparatus as recited in claim 14 wherein said hanger bar latch is attached to said latch staff.

16. The apparatus as recited in claim 14 wherein said hanger bar latch is positioned beneath said latching rail.

17. The apparatus as recited in claim 13 wherein said latch release handle is pivotally attached to said latch staff.

18. The apparatus as recited in claim 1 including means to allow said hanger bar to pivot vertically and horizontally with respect to said first support means.

19.
    In a repositionable thermal barrier apparatus extendable between first and second sidewalls, said apparatus of the type having a hanger bar extending between said first and second sidewalls, said hanger bar having first and second ends, and a thermal barrier depending from said hanger bar, the improvement comprising:

first and second means for supporting, respectively, said first and second ends of said hanger bar at said sidewalls, said first support means including means for adjusting the position of said first hanger bar end along said first sidewall, said adjusting means further including means to pivotally mount said first hanger bar end to said adjusting means, said adjusting means further including means to releaseably retain said adjusting means at selectable sites along said first support means, said second support means further including means to releaseably attach said second hanger bar end at selected sites along said second sidewall, said attaching means being selectively detachable from said second support means to enable said second bar end to be selectively secured to said first support means at said first sidewall thereby moving said hanger bar from a position wherein said hanger bar extends from said first sidewall to said second sidewall to a position where said first and second ends of said hanger bar are supported at said first sidewall.

20. The apparatus as recited in claim 19, wherein said pivot means includes means to allow said hanger bar to pivot vertically and horizontally with respect to said first support means.

* * * * *